(12) United States Patent
Ogasawara et al.

(10) Patent No.: US 6,479,189 B1
(45) Date of Patent: Nov. 12, 2002

(54) SEALED ALKALINE STORAGE BATTERY WITH A MANGANESE CONTAINING NIOH ELECTRODE

(75) Inventors: Takeshi Ogasawara; Yoshifumi Magari, both of Hirakata; Nobuyuki Higashiyama, Ikeda; Mamoru Kimoto, Hirakata; Yasuhiko Itoh, Yawata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 73 days.

(21) Appl. No.: 09/630,458

(22) Filed: Aug. 2, 2000

(30) Foreign Application Priority Data

Aug. 2, 1999 (JP) .............................................. 11-218641

(51) Int. Cl.$^7$ ............................................... H01M 4/52
(52) U.S. Cl. ..................................... 429/223; 429/218.1
(58) Field of Search ......................................... 429/223

(56) References Cited

U.S. PATENT DOCUMENTS 5,348,822 A * 9/1994 Ovshinsky .................. 429/223
5,700,596 A * 12/1997 Ikoma ........................ 429/206
5,718,988 A * 2/1998 Asano ........................ 429/206
5,965,295 A * 10/1999 Bando ........................ 429/223
6,077,626 A * 6/2000 Nogami ...................... 429/223

FOREIGN PATENT DOCUMENTS

| JP | 5021064 | 1/1993 |
| JP | 7335214 | 12/1995 |
| JP | 10172561 | 6/1998 |

* cited by examiner

*Primary Examiner*—Patrick Ryan
*Assistant Examiner*—Mark Ruthkosky
(74) *Attorney, Agent, or Firm*—Birch, Stewart., Kolasch & Birch, LLP

(57) ABSTRACT

The sealed alkaline storage battery of this invention includes a nonsintered nickel positive electrode using, as an active material, manganese-containing α-nickel hydroxide including, as a solid-solution element, 15 through 50 wt % of manganese on the basis of a total amount of nickel and manganese; a negative electrode; and an alkaline electrolyte including 0.55 through 0.80 g of water per gram of the manganese-containing α-nickel hydroxide. In this manner, the invention provides an alkaline storage battery exhibiting high positive electrode active material utilization for a large number of charge-discharge cycles.

2 Claims, No Drawings

SEALED ALKALINE STORAGE BATTERY WITH A MANGANESE CONTAINING NIOH ELECTRODE

BACKGROUND OF THE INVENTION

This application claims the Paris convention priority of Japanese Patent Application No. 11-218641/1999 filed on Aug. 2, 1999, which is incorporated herein by reference.

The present invention relates to a sealed alkaline storage battery.

Nickel positive electrodes of sealed alkaline storage batteries are divided into two types: a sintered electrode and a nonsintered electrode. A sintered nickel positive electrode, which uses a sintered substance of a metal as a conductive substrate (current collector), has a problem derived from low porosity of the sintered substance that an active material can be packed in merely a small amount, namely, the energy density is low. Therefore, attention has been recently attracted to a nonsintered nickel positive electrode that uses, as the conductive substrate, a nonsintered substance with high porosity such as nickel foam so that the active material can be packed in a large amount.

The nonsintered nickel positive electrode, however, has a problem of poor active material utilization. One of the reasons for the poor active material utilization of the nonsintered nickel positive electrode is as follows: Part of nickel hydroxide is changed into γ-NiOOH with low apparent density during charge so as to expand the electrode. As a result, a separator is compressed by the electrode, and hence, lack of an electrolyte (dry out) is caused in the separator, which increases the internal resistance of the battery.

Japanese Laid-Open Patent Publication No. 5-21064/1993 describes that γ-NiOOH can be suppressed from being produced during charge by using nickel hydroxide including 1 through 7 wt % of manganese as a solid-solution element and using an electrolyte (with specific gravity of 1.23 through 1.40) in amount of 1.0 through 2.0 cm³ per 1 Ah of the battery capacity. The publication reports that an alkaline storage battery can thus attain a long charge-discharge cycle life.

It has been found, however, as a result of examination made by the present inventors, that the alkaline storage battery described in this publication is poor in the charge acceptance because of its small content of manganese in nickel hydroxide and that the dry out occurs in a small number of cycles because of the small amount of electrolyte. The content of manganese as a solid-solution element of 7 wt % corresponds to approximately 11 wt % when converted into a ratio of the amount of manganese to the total amount of nickel and manganese. Also, the amount of electrolyte of 2.0 cm³ per 1 Ah of the battery capacity corresponds to 0.53 g at most (namely, in an ideal battery having a battery capacity equal to the theoretical capacity) when converted into the amount of water per gram of nickel hydroxide.

Accordingly, an object of the invention is providing a sealed alkaline storage battery that can exhibit high active material utilization for a large number of charge-discharge cycles owing to its good charge acceptance and minimal probability of occurrence of the dry out.

SUMMARY OF THE INVENTION

The sealed alkaline storage battery of this invention (present battery) comprises a nonsintered nickel positive electrode using nickel hydroxide as an active material, a negative electrode and an alkaline electrolyte, and the nickel hydroxide is manganese-containing α-nickel hydroxide including, as a solid-solution element, 15 through 50 wt % of manganese on the basis of a total amount of nickel and manganese, and the alkaline electrolyte includes 0.55 through 0.80 g of water per gram of the manganese-containing α-nickel hydroxide.

As a result, the invention provides an alkaline storage battery that can exhibit high positive electrode active material utilization for a large number of charge-discharge cycles.

DETAILED DESCRIPTION OF THE INVENTION

In the present battery, manganese-containing α-nickel hydroxide including, as a solid-solution element, 15 through 50 wt % of manganese on the basis of the total amount of nickel and manganese is used as a positive electrode active material. When the content of manganese is out of this range, the oxygen overvoltage of the manganese-containing α-nickel hydroxide is so low that the charge acceptance and the active material utilization of the positive electrode cannot be sufficiently improved. The manganese-containing α-nickel hydroxide is oxidized through charge so as to be changed into manganese-containing γ-NiOOH. The manganese-containing γ-NiOOH including 15 through 50 wt % of manganese has much higher oxygen overvoltage (corresponding to a difference between the oxygen evolution potential and the oxidation potential) than β-NiOOH produced by charging β-nickel hydroxide. Accordingly, the present battery attains high charge acceptance of the positive electrode and high positive electrode active material utilization at the initial stage of the charge-discharge cycles.

The present battery uses the alkaline electrolyte including 0.55 through 0.80 g of water per gram of the manganese-containing α-nickel hydroxide. A conventional alkaline storage battery using a nonsintered nickel positive electrode generally uses an alkaline electrolyte including 0.20 through 0.50 g of water per gram of nickel hydroxide. The γ-NiOOH produced through charge of the α-nickel hydroxide has, however, low apparent density. Therefore, the nonsintered nickel positive electrode of the conventional battery expands during charge so as to compress the separator, and hence, the dry out can easily occur in the separator. The dry out can increase the internal resistance of the battery, which degrades the charge acceptance and the active material utilization. Accordingly, in order to suppress the dry out caused because of the production of the γ-NiOOH, the present battery uses a larger amount of alkaline electrolyte than the conventional battery. The water content of the alkaline electrolyte should be 0.55 through 0.80 g per gram of the manganese-containing α-nickel hydroxide for the following reason: When the water content is smaller than 0.55 g, it is difficult to suppress the dry out. When the water content exceeds 0.80 g, the volume of a space in the battery can is so small that the internal pressure of the battery can be easily increased during charge, resulting in easily causing leakage of the alkaline electrolyte.

A specific example of the nonsintered nickel positive electrode is a pasted nickel electrode obtained by coating a conductive substrate with a paste including an active material and drying the resultant. Specific examples of the conductive substrate are foam nickel, a felted nickel fiber porous material, punching metal, and a foamed metal of iron or the like coated with nickel plating or the like. Examples of the nonsintered nickel positive electrode other than the pasted nickel electrode are a tubular nickel electrode obtained by packing an active material in a tubular metallic conductive substance, a pocket nickel electrode obtained by packing an active material in a pocket-like metallic conductive substance, and a nickel electrode for a button-type cell obtained by compressedly molding an active material and a reticular metallic conductive substance.

Examples of the negative electrode of the present battery are a hydrogen-absorbing alloy electrode, a cadmium electrode and a zinc electrode.

Embodiments

Other features of the invention will become more apparent in the course of the following descriptions of exemplary embodiments which are given for illustration of the invention and not intended to be limiting thereof.

EXPERIMENT 1

The relationship between the manganese content of manganese-containing α-nickel hydroxide and the active material utilization was examined.

Preparation of manganese-containing α-nickel hydroxide:

To 5 liters of an aqueous solution obtained by dissolving, in water, manganese sulfate ($MnSO_4 \cdot 5H_2O$) and nickel sulfate ($NiSO_4 \cdot 7H_2O$) in amounts listed in Table 1, aqueous solutions respectively including 10 wt % of ammonia and 10 wt % of sodium hydroxide were added dropwise with monitoring pH of the resultant solution with a pH meter, so as to adjust the resultant solution to pH 9.5±0.3. The thus obtained solution was stirred for 1 hour and filtered, and the filtrated substance was washed with water and dried at 80° C. Thus, five types of manganese-containing α-nickel hydroxides each including manganese as a solid-solution element were obtained. The manganese content of each of these manganese-containing α-nickel hydroxides (the ratio of the amount of manganese to the total amount of nickel and manganese) obtained through quantitative analysis by the atomic absorption analysis is listed in Table 2 below.

Preparation of alkaline electrolyte:

An alkaline electrolyte was prepared by dissolving 30 g of 85 wt % potassium hydroxide (including 85 wt % of potassium hydroxide and 15 wt % of water) in 55 g of water.

Preparation of nonsintered nickel positive electrodes:

Paste was prepared by kneading 90 parts by weight of a mixture including each of the manganese-containing α-nickel hydroxides and cobalt hydroxide in a weight ratio of 9:1 and 20 parts by weight of a 1 wt % methyl cellulose aqueous solution serving as a binder. The paste was packed in a porous substrate of nickel foam (with porosity of 95% and an average pore diameter of 200 μm), and the resultant was dried and compressedly molded into a sheet. Thus, five types of nonsintered nickel positive electrodes were prepared. Each of the nonsintered nickel positive electrodes includes 3.5 g of the manganese-containing α-nickel hydroxide.

Fabrication of alkaline storage batteries:

AA size sealed alkaline storage batteries A1 through A5 were fabricated by using each of the nonsintered nickel positive electrodes, a known pasted cadmium electrode (negative electrode) having larger electrochemical capacity than the positive electrode, a polyamide nonwoven fabric (serving as a separator), 3.0 g of the alkaline electrolyte (including water in amount of 0.60 g per gram of the manganese-containing α-nickel hydroxide), a metallic battery can, a metallic battery cap and the like.

Active material utilization at 5th and 75th cycles and number of batteries suffering leakage:

With respect to each of the batteries, 75 charge-discharge cycles were run in each cycle of which the battery was charged at 70 mA at 25° C. for 16 hours and then discharged to 1.0 V at 1000 mA at 25° C. Thus, the active material utilization at the 5th cycle and the 75th cycle of the nonsintered nickel positive electrode used in each battery was calculated in accordance with a formula below. Also, with respect to each type of the batteries, ten batteries were used to obtain the number of batteries suffering leakage after 5 charge-discharge cycles. The results are shown in Table 2. Each active material utilization at the 5th or 75th cycle listed in Table 2 is shown as an index obtained by assuming the active material utilization of the alkaline storage battery A3 at the 5th cycle as 100. Also, the numerator of a fraction listed in the item of the number of batteries suffering leakage in Table 2 corresponds to the number of batteries from which the electrolyte leaked.

Active material utilization (%)={Discharge capacity(mAh) at 5th or 75th cycle/[Amount of nickel hydroxide (g)×288(mAh/g)]}×100

TABLE 1

| Battery | Manganese sulfate (g) | Nickel sulfate (g) |
| --- | --- | --- |
| A1 | 35.1 | 440.2 |
| A2 | 43.9 | 430.7 |
| A3 | 87.8 | 382.8 |
| A4 | 219.4 | 239.3 |
| A5 | 241.4 | 215.3 |

TABLE 2

| Battery | Manganese content of manganese-containing α-nickel hydroxide (wt %) | Water content of alkaline electrolyte per gram of manganese-containing α-nickel hydroxide (g) | Active material utilization at 5th cycle (proportion of batteries suffering leakage) | Active material utilization at 75th cycle |
| --- | --- | --- | --- | --- |
| A1 | 8 | 0.60 | 90 (0/10) | 88 |
| A2 | 15 | 0.60 | 100 (0/10) | 99 |
| A3 | 20 | 0.60 | 100 (0/10) | 100 |
| A4 | 50 | 0.60 | 97 (0/10) | 95 |
| A5 | 55 | 0.60 | 85 (0/10) | 84 |

It is understood from Table 2 that in order to obtain an alkaline storage battery exhibiting high active material utilization at the initial stage of charge-discharge cycles, it is necessary to use manganese-containing α-nickel hydroxide including, as a solid-solution element, 15 through 50 wt % of manganese on the basis of the total amount of nickel and manganese.

EXPERIMENT 2

The relationship between the amount of water included in the alkaline electrolyte per gram of the manganese-containing α-nickel hydroxide and the active material utilization was examined.

Alkaline storage batteries A6 through A10 were fabricated in the same manner as the alkaline storage battery A3 except that 2.25 g, 2.75 g, 3.5 g, 4.0 g and 4.5 g of the alkaline electrolyte were used in the respective batteries instead of 3.0 g of the alkaline electrolyte. The amounts of water included in the alkaline electrolytes per gram of the manganese-containing α-nickel hydroxide in these alkaline storage batteries A6 through A10 are 0.45 g, 0.55 g, 0.70 g, 0.80 g and 0.90 g, respectively. The manganese content (the ratio of the amount of manganese to the total amount of nickel and manganese) of the manganese-containing α-nickel hydroxide used as the active material is 20 wt % in all of these batteries.

Furthermore, an alkaline storage battery A11 was fabricated in the same manner as the alkaline storage battery A3 except that 57.0 g of manganese sulfate ($MNSO_4.5H_2O$), 416.3 g of nickel sulfate ($NiSO_4.7H20$) and 2.5 g, instead of 3.0 g, of the alkaline electrolyte were used. In the alkaline storage battery A11, the amount of water included in the alkaline electrolyte per gram of the manganese-containing α-nickel hydroxide is 0.50 g, and the manganese content (the ratio of the amount of manganese to the total amount of nickel and manganese) of the manganese-containing α-nickel hydroxide used as the active material is 13 wt %.

Each of the alkaline storage batteries A6 through A11 was subjected to the charge-discharge cycle test under the same conditions as in Experiment 1, thereby obtaining the active material utilization at the 5th and 75th cycles of the non-sintered nickel positive electrode used in each battery and the number of batteries suffering leakage after 5 charge-discharge cycles. The results are shown in Table 3. With respect to the alkaline storage battery A10, eight batteries among ten suffered leakage after 5 charge-discharge cycles, and hence, the charge-discharge cycle test was concluded at that point. Table 3 also lists the results obtained in the alkaline storage battery A3 shown in Table 2, and each active material utilization at the 5th or 75th cycle listed in Table 3 is shown as an index obtained by assuming the active material utilization of the alkaline storage battery A3 at the 5th cycle as 100.

TABLE 3

| Battery | Manganese content of manganese-containing α-nickel hydroxide (wt %) | Water content of alkaline electrolyte per gram of manganese-containing α-nickel hydroxide (g) | Active material utilization at 5th cycle (proportion of batteries suffering leakage) | Active material utilization at 75th cycle |
|---|---|---|---|---|
| A6 | 20 | 0.45 | 93 (0/10) | 74 |
| A7 | 20 | 0.55 | 100 (0/10) | 100 |
| A3 | 20 | 0.60 | 100 (0/10) | 100 |
| A8 | 20 | 0.70 | 100 (0/10) | 100 |
| A9 | 20 | 0.80 | 100 (0/10) | 100 |
| A10 | 20 | 0.90 | 93 (8/10) | — |
| A11 | 13 | 0.50 | 91 (0/10) | 73 |

It is understood from Table 3 that in order to obtain an alkaline storage battery exhibiting high active material utilization for a large number of charge-discharge cycles, it is necessary to use an alkaline electrolyte including water in amount of 0.55 through 0.80 g per gram of the manganese-containing α-nickel hydroxide. The active material utilization at the 5th cycle of the alkaline storage battery A11 is low because the manganese content of the nickel hydroxide is too small to attain good charge acceptance. Also, the active material utilization at the 75th cycle of the alkaline storage battery A11 is low because the electrolyte lack is caused in the separator so as to increase the internal resistance of the battery.

In this manner, the invention provides an alkaline storage battery exhibiting high positive electrode active material utilization for a large number of charge-discharge cycles.

Obviously, numerous modifications and variations of the present invention are possible in light of the above teachings. It is therefore to be understood that within the scope of the appended claims the invention may be practiced otherwise than as specifically described herein.

What is claimed is:

1. A sealed alkaline storage battery comprising:
    a nonsintered nickel positive electrode using, as an active material, manganese-containing α-nickel hydroxide including, as a solid-solution element, 15 through 50 wt % of manganese on the basis of a total amount of nickel and manganese;
    a negative electrode; and
    an alkaline electrolyte including 0.55 through 0.80 g of water per gram of the manganese-containing α-nickel hydroxide.

2. The sealed alkaline storage battery according to claim 1, wherein the negative electrode is a member selected from the group consisting of a hydrogen-absorbing alloy electrode, a cadmium electrode, and a zinc electrode.

* * * * *